US012138763B2

(12) United States Patent
Schmidt et al.

(10) Patent No.: US 12,138,763 B2
(45) Date of Patent: Nov. 12, 2024

(54) DRIVING-IN DEVICE

(71) Applicant: Hilti Aktiengesellschaft, Schaan (LI)

(72) Inventors: Dominik Schmidt, Frastanz (AT); Ajinkya Hemant Dange, Eschen (LI)

(73) Assignee: Hilti Aktiengesellschaft, Schaan (LI)

( * ) Notice: Subject to any disclaimer, the term of this patent is extended or adjusted under 35 U.S.C. 154(b) by 570 days.

(21) Appl. No.: 17/416,441

(22) PCT Filed: Nov. 29, 2019

(86) PCT No.: PCT/EP2019/083016
§ 371 (c)(1),
(2) Date: Jun. 18, 2021

(87) PCT Pub. No.: WO2020/126406
PCT Pub. Date: Jun. 25, 2020

(65) Prior Publication Data

US 2022/0072689 A1 Mar. 10, 2022

(30) Foreign Application Priority Data

Dec. 20, 2018 (EP) .................................... 18214320

(51) Int. Cl.
*B25C 1/00* (2006.01)
*B25C 1/04* (2006.01)
*B25C 1/18* (2006.01)

(52) U.S. Cl.
CPC .............. *B25C 1/001* (2013.01); *B25C 1/008* (2013.01); *B25C 1/047* (2013.01); *B25C 1/188* (2013.01)

(58) Field of Classification Search
CPC ......... B25C 1/001; B25C 1/008; B25C 1/047; B25C 1/188; B25C 5/1606; B23P 19/001; B25B 23/045
See application file for complete search history.

(56) References Cited

U.S. PATENT DOCUMENTS 5,363,999 A * 11/1994 Braun .................. B25C 5/1624 227/135
5,477,601 A * 12/1995 Jasmer ...................... B25C 7/00 227/76
5,890,405 A * 4/1999 Becker ................. B25B 23/147 81/434
6,915,724 B2 7/2005 Kigel et al.
(Continued)

FOREIGN PATENT DOCUMENTS

DE 202 14 489 U1 3/2004
DE 10 2011 089 521 A1 6/2013

OTHER PUBLICATIONS

International Search Report and Written Opinion in International Application No. PCT/EP2019/083016, dated Mar. 4, 2020.

*Primary Examiner* — David B. Thomas
(74) *Attorney, Agent, or Firm* — Leydig, Voit & Mayer, Ltd.

(57) ABSTRACT

An apparatus for driving a fastening element in a driving direction into a base material, having a receptacle for the fastening element, from which the fastening element is driven into the base material, having a magazine for supplying fastening elements in a transport direction to the receptacle, wherein the side of the magazine facing the driving direction has a slot which runs in the transport direction, and having a dust deflector which covers the slot.

16 Claims, 5 Drawing Sheets

(56) References Cited

U.S. PATENT DOCUMENTS

| | | | | |
|---|---|---|---|---|
| 7,004,368 | B1 | 2/2006 | Chen | |
| 7,913,890 | B2 * | 3/2011 | Gross | B25C 1/06 227/4 |
| 8,051,919 | B2 * | 11/2011 | Hagan | B25C 1/003 173/13 |
| 8,556,149 | B2 * | 10/2013 | Schnell | B25C 1/04 173/218 |
| 8,646,672 | B2 * | 2/2014 | Wu | B25C 1/005 227/119 |
| 9,469,021 | B2 * | 10/2016 | Gregory | B25C 1/005 |
| 9,486,904 | B2 * | 11/2016 | Gregory | B25C 7/00 |
| 9,498,871 | B2 * | 11/2016 | Gregory | B25C 1/008 |
| 9,649,755 | B2 * | 5/2017 | Gregory | B25C 1/005 |
| 9,827,658 | B2 * | 11/2017 | Gregory | B25C 1/005 |
| 10,173,310 | B2 * | 1/2019 | Wyler | B25C 1/06 |
| 10,493,607 | B2 * | 12/2019 | Jaskot | B25C 1/001 |
| 10,888,981 | B2 * | 1/2021 | Gregory | B25C 5/162 |
| 11,229,995 | B2 * | 1/2022 | Gregory | B25C 1/00 |
| 2004/0123704 | A1 | 7/2004 | Kigel et al. | |
| 2013/0255447 | A1 * | 10/2013 | Po | B25B 23/045 81/57.11 |
| 2014/0338505 | A1 | 11/2014 | Foser et al. | |
| 2019/0202042 | A1 * | 7/2019 | Wu | B25C 1/047 |

* cited by examiner

DRIVING-IN DEVICE

CROSS-REFERENCE TO RELATED APPLICATIONS

This patent application is the U.S. National Stage of International Patent Application No. PCT/EP2019/083016, filed Nov. 29, 2019, which claims the benefit of European Patent Application No. 18214320.6, filed Dec. 20, 2018, which are each incorporated by reference.

TECHNICAL FIELD

The invention relates to an apparatus for driving a fastening element in a driving direction into a base material.

PRIOR ART

Apparatuses of this type conventionally comprise a receptacle for the fastening element, from which the fastening element is driven into the base material, and a magazine for supplying fastening elements in a transport direction to the receptacle. If an apparatus of this type is used in a dusty environment, for example on a building site, there is the risk of dust entering the magazine and impairing the supply of the fastening elements to the receptacle.

It is an object of the invention to make available an apparatus for driving a fastening element into a base material, in which transport of the fastening element within the apparatus is improved.

SUMMARY OF THE INVENTION

The object is achieved in an apparatus for driving a fastening element in a driving direction into a base material, having a receptacle for the fastening element, from which the fastening element is driven into the base material, having a magazine for supplying fastening elements in a transport direction to the receptacle, wherein the side of the magazine facing the driving direction has a slot which runs in the transport direction, and having a dust deflector which covers the slot.

An advantageous embodiment is characterized in that the dust deflector a brush seal. The brush seal preferably comprises a multiplicity of bristles which protrude in each case from the magazine in a bristle direction, wherein the transport direction and the bristle direction enclose an acute angle. The bristle direction is particularly preferably inclined in relation to the driving direction.

An advantageous embodiment is characterized in that the apparatus has a guide channel for the fastening element during the driving into the base material.

An advantageous embodiment is characterized in that the apparatus has a setting piston which, in order to transmit energy to the fastening element arranged in the receptacle, can be driven from a starting position, in which the setting piston is inoperative, toward the receptacle. The apparatus preferably comprises a power unit for driving the setting piston toward the fastening element, and a trigger, the actuation of which triggers the driving of the piston toward the fastening element.

An advantageous embodiment is characterized in that the apparatus comprises a pressing device for interrogating whether the work apparatus is pressed against a base material, wherein the pressing device is in a pressing position when the work apparatus is pressed against a base material.

The pressing device preferably permits the piston to be driven toward the fastening element only in the pressing position.

An advantageous embodiment is characterized in that the apparatus comprises a feed device for transporting the fastening element from the magazine into the receptacle.

An advantageous embodiment is characterized in that the magazine is provided for transporting fastening elements which extend through the slot. The fastening elements preferably protrude beyond the dust deflector in the driving direction.

EXEMPLARY EMBODIMENTS

The invention will be explained in more detail below using exemplary embodiments with reference to the drawings, in which.

Figure 3:
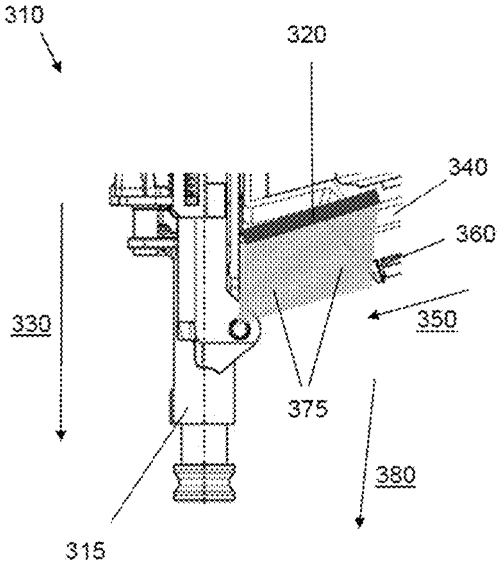
FIG. 3 shows a detail of a driving apparatus having a dust deflector.
Figure 4:
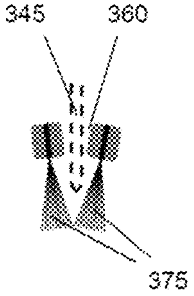
Figure 5:
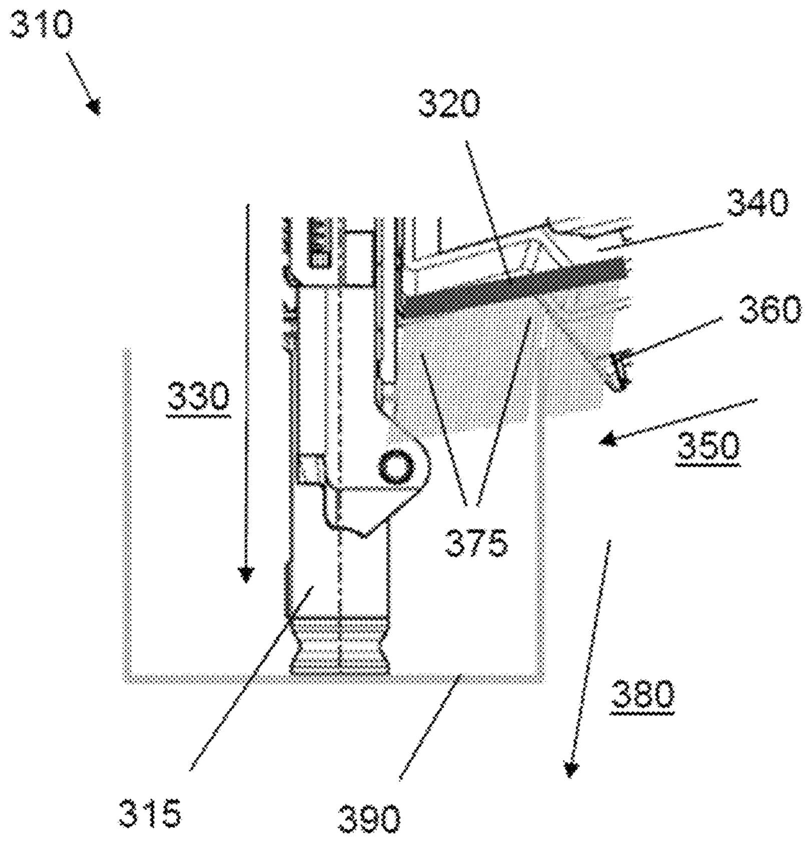
Figure 6:
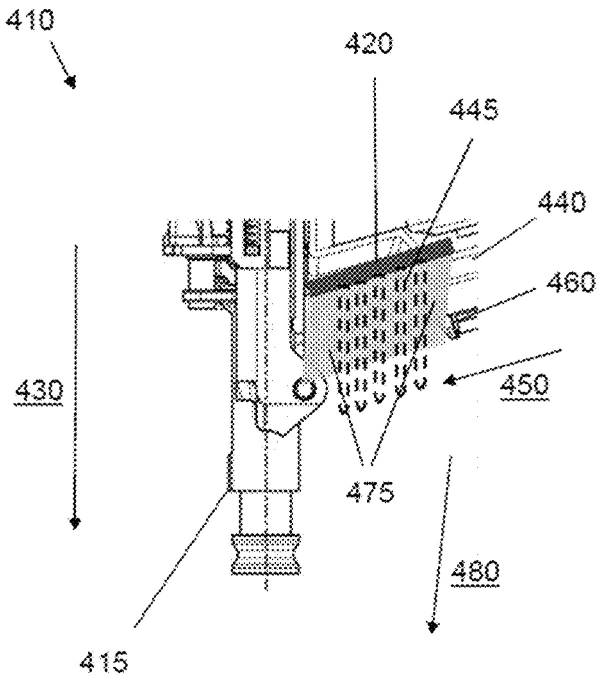
Figure 7:
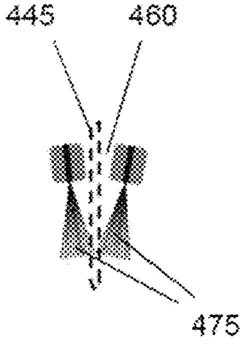

FIG. 4 schematically shows a dust deflector,

FIG. 5 shows a further detail of the driving apparatus from FIG. 3 and a rail, FIG. 6 shows a detail of a driving apparatus having a dust deflector, and FIG. 7 schematically shows a dust deflector.

Figure 1:
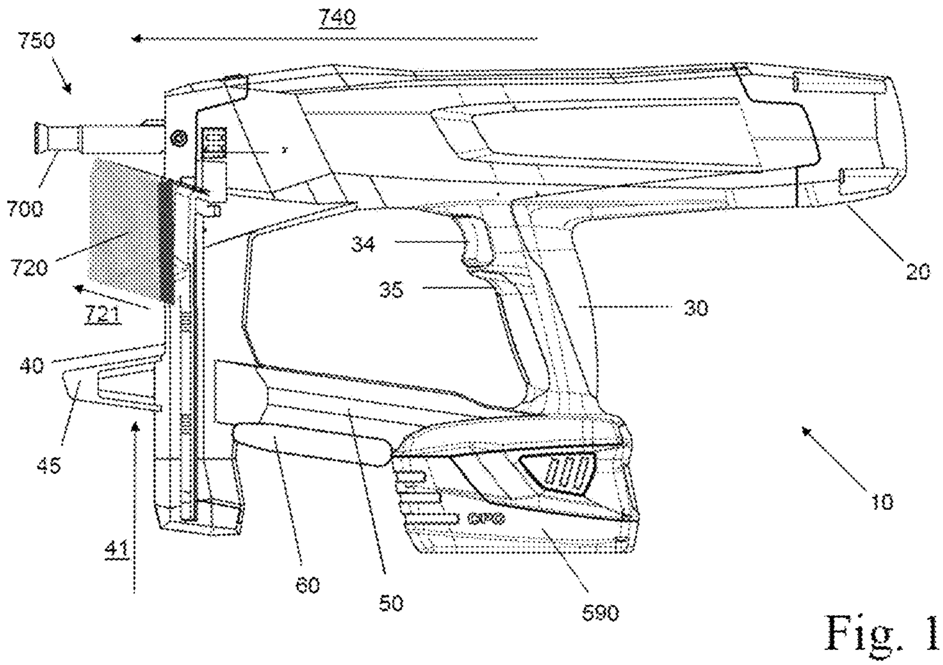
FIG. 1 shows a driving apparatus in a side view.

FIG. 1 shows in a side view a driving apparatus 10 for driving a fastening element, for example a nail or bolt, in a driving direction 740 into a base material. The driving apparatus 10 has an energy transmission element (not represented) for transmitting energy to the fastening element and also a housing 20 containing the energy transmission element and a power unit (likewise not represented) for conveying the energy transmission element.

The driving apparatus 10 also has a handle 30, a magazine 40 and a bridge 50 connecting the handle 30 to the magazine 40. Attached to the bridge 50 are a scaffold hook 60 for suspending the driving apparatus 10 on a scaffold or the like, and an electrical energy store designed as an electrical storage battery 590. On the handle 30, a trigger 34 and a grip sensor designed as a hand switch 35 are arranged. Furthermore, the driving apparatus 10 has a guide channel 700 for guiding the fastening element, a receptacle 710 (FIG. 2) for the fastening element, from which the fastening element is driven into the base material, and a pressing device 750 for identifying a distance of the driving apparatus 10 from a base material (not represented). The pressing device 750 is in a pressing position when the driving apparatus 10 is pressed against a base material. Only then does it permit the driving element to be driven toward the fastening element. Aligning the driving apparatus perpendicularly to a base material is assisted by an alignment aid 45.

The magazine 40 serves for supplying fastening elements in a transport direction 41 to the receptacle 710. For this purpose, a feed device is preferably arranged in the magazine 40. The magazine 40 has a slot which is not visible in FIGS. 1 and 2, runs in the transport direction 41 and is covered by a dust deflector 720 in the form of a brush seal. For this purpose, the dust deflector 720 comprises a multiplicity of bristles which protrude in each case from the magazine 40 in a bristle direction 721. The transport direction 41 and the bristle direction 721 enclose an acute angle here; furthermore, the bristle direction 721 is inclined in relation to the driving direction 740.

Figure 2:
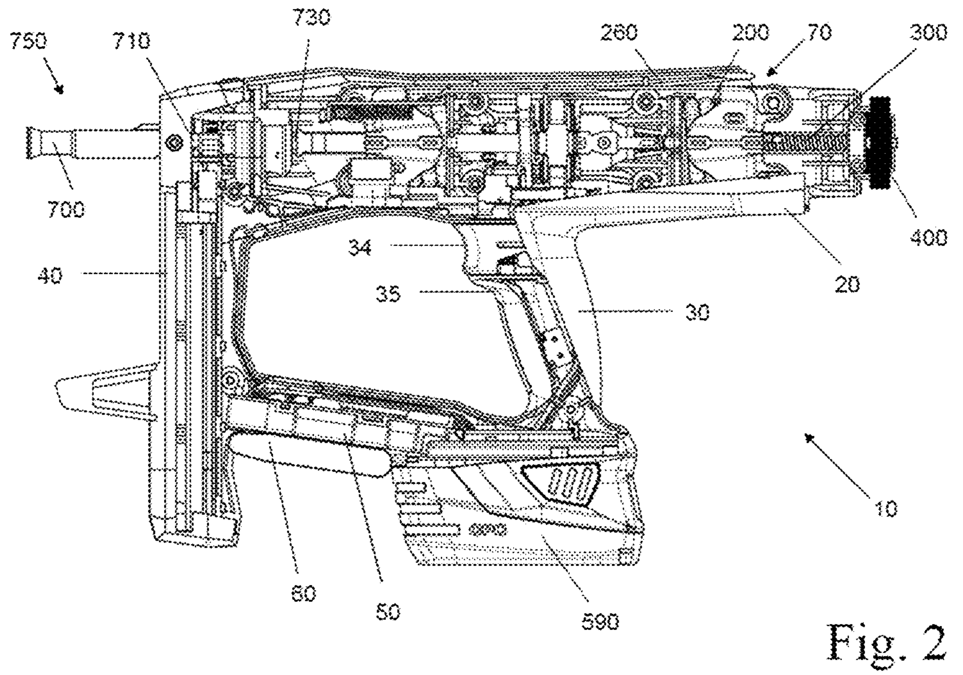
FIG. 2 shows the driving apparatus from FIG. 1 with an opened housing.

FIG. 2 shows the driving apparatus 10 with an opened housing 20. The housing 20 contains a power unit 70 for conveying the energy transmission element 730 which is in the form of a setting piston. In order to transmit energy to the fastening element arranged in the receptacle 710, the setting piston 730 can be driven from a starting position, in which the setting piston 730 is inoperative, toward the receptacle 710. The power unit 70 comprises an electric motor (not represented) for converting electrical energy from the storage battery 590 into rotational energy, a torque transmission device comprising a gear mechanism 400 for transmitting a torque of the electric motor to a motion converter formed as a spindle drive 300, a force transmission device comprising a roller train 260 for transmitting a force from the motion converter to a mechanical energy store formed as a spring 200 and for transmitting a force from the spring 200 to the energy transmission element.

An advantageous embodiment is characterized in that the magazine is provided for transporting fastening elements which extend through the slot. The fastening elements preferably protrude beyond the dust deflector in the driving direction.

FIGS. 3, 4 and 5 show a detail of a driving apparatus 310 having a dust deflector 320. The driving apparatus 310 comprises a receptacle for a fastening element, which receptacle is concealed by a guide channel 315 in FIGS. 3, 4 and 5 and from which the fastening element is driven in a driving direction 330 into a base material. Furthermore, the driving apparatus 310 comprises a magazine 340 for supplying fastening elements 345 in a transport direction 350 to the receptacle, wherein the side of the magazine 340 facing the driving direction 330 has a slot 360 which runs in the transport direction 350.

In addition, the driving apparatus 310 comprises the dust deflector 320 which covers the slot 360. The dust deflector 320 comprises a brush seal having a multiplicity of bristles 375 which protrude in each case from the magazine 340 in a bristle direction 380. The transport direction 350 and the bristle direction 380 firstly enclose an acute angle here; secondly, the bristle direction 380 is additionally inclined in relation to the driving direction 310. As a result, frictional forces which may occur between the fastening elements 345 and the bristles 375 during transport of a nail in the magazine 340 are reduced. In the example shown, the fastening elements 345 extend through the slot 360.

FIG. 5 shows the driving apparatus 310 during use in a rail 390 which is fastened with the fastening elements 345. For this purpose, the guide channel 315 enters the rail 390. The flexibility of the bristles 375 enables them to be deflected from the rail 390, and therefore the accessibility of the driving apparatus 310 is not impeded by the dust deflector 320.

FIGS. 6 and 7 show a detail of a driving apparatus 410 having a dust deflector 420. The driving apparatus 410 comprises a receptacle for a fastening element, which receptacle is concealed by a guide channel 415 in FIGS. 3, 4 and 5 and from which the fastening element is driven in a driving direction 430 into a base material. Furthermore, the driving apparatus 410 comprises a magazine 440 for supplying fastening elements 445 in a transport direction 450 to the receptacle, wherein the side of the magazine 440 facing the driving direction 430 has a slot 460 which runs in the transport direction 450.

In addition, the driving apparatus 410 comprises a dust deflector 470 which covers the slot 460. The dust deflector 470 comprises a brush seal having a multiplicity of bristles 475 which protrude in each case from the magazine 440 in a bristle direction 480. The transport direction 450 and the bristle direction 480 firstly enclose an acute angle here; secondly, the bristle direction 480 is additionally inclined in relation to the driving direction 410. As a result, frictional forces which may occur between the fastening elements 445 and the bristles 475 during transport of a nail in the magazine 440 are reduced. In the example shown, the fastening elements 445 extend through the slot 460 and between two rows of bristles of the dust deflector 420 because the fastening elements 445 protrude beyond the dust deflector 420 in the driving direction 430.

The invention has been explained above on the basis of a number of exemplary embodiments of a driving apparatus. The features described can be transferred individually or in combination from each exemplary embodiment to all other exemplary embodiments as long as they do not contradict one another. It should be noted that the apparatus according to the invention can also be used for other purposes.

The invention claimed is:

1. An apparatus for driving a fastening element in a driving direction into a base material, having a receptacle for the fastening element, from which the fastening element is driven into the base material; a magazine for supplying fastening elements in a transport direction to the receptacle, wherein a side of the magazine facing the driving direction has a slot which runs in the transport direction, and a dust deflector which covers the slot, wherein the dust deflector comprises a brush seal.

2. The apparatus as claimed in claim 1, wherein the brush seal comprises a multiplicity of bristles which each protrude from the magazine in a bristle direction, and wherein the transport direction and the bristle direction enclose an acute angle.

3. The apparatus as claimed in claim 2, wherein the bristle direction is inclined in relation to the driving direction.

4. The apparatus as claimed in claim 3, having a setting piston which, in order to transmit energy to the fastening element arranged in the receptacle, can be driven from a starting position, in which the setting piston is inoperative, toward the fastening element.

5. The apparatus as claimed in claim 4, comprising a power unit for driving the setting piston toward the fastening element, and a trigger, wherein actuation of the trigger triggers driving the piston toward the fastening element.

6. The apparatus as claimed in claim 2, having a setting piston which, in order to transmit energy to the fastening element arranged in the receptacle, can be driven from a starting position, in which the setting piston is inoperative, toward the fastening element.

7. The apparatus as claimed in claim 6, comprising a power unit for driving the setting piston toward the fastening element, and a trigger, wherein actuation of the trigger triggers driving the piston toward the fastening element.

8. The apparatus as claimed in claim 1, further comprising a guide channel for the fastening element during driving into the base material.

9. The apparatus as claimed in claim 8, having a setting piston which, in order to transmit energy to the fastening element arranged in the receptacle, can be driven from a starting position, in which the setting piston is inoperative, toward the fastening element.

10. The apparatus as claimed in claim 9, comprising a power unit for driving the setting piston toward the fastening element, and a trigger, wherein actuation of the trigger triggers driving the piston toward the fastening element.

11. The apparatus as claimed in claim 1, having a setting piston which, in order to transmit energy to the fastening element arranged in the receptacle, can be driven from a starting position, in which the setting piston is inoperative, toward the fastening element.

12. The apparatus as claimed in claim 11, comprising a power unit for driving the setting piston toward the fastening element, and a trigger, wherein actuation of the trigger triggers driving the piston toward the fastening element.

13. The apparatus as claimed in claim 1, wherein the pressing device permits the piston to be driven toward the fastening element only in the pressing position.

14. The apparatus as claimed in claim 1, comprising a feed device for transporting the fastening element from the magazine into the receptacle.

15. The apparatus as claimed in claim 1, wherein the magazine is provided for transporting fastening elements which extend through the slot.

16. The apparatus as claimed in claim 15, wherein the fastening elements protrude beyond the dust deflector in the driving direction.

* * * * *